United States Patent [19]

McMath

[11] 3,720,220

[45] March 13, 1973

[54] SAFETY VALVE
[75] Inventor: Jack A. McMath, Fort Thomas, Ky.
[73] Assignee: Dover Corporation, Cincinnati, Ohio
[22] Filed: March 17, 1971
[21] Appl. No.: 125,261

[52] U.S. Cl. ................................. 137/75, 137/539
[51] Int. Cl. ............................................. F16k 17/38
[58] Field of Search ................................. 220/89 B; 137/72–77

[56] References Cited

UNITED STATES PATENTS 2,707,965  5/1955  Allen ........................................ 137/75
1,243,998  10/1917 Smyly ....................................... 137/75

FOREIGN PATENTS OR APPLICATIONS 536,051  5/1941  Great Britain ........................ 137/75
549,406  11/1942 Great Britain ........................ 137/75

Primary Examiner—Martin P. Schwadron
Assistant Examiner—Richard Gerard
Attorney—Kinney and Schenk

[57] ABSTRACT

A safety valve for preventing the flow of materials therethrough in the presence of a predetermined external temperature condition is disclosed. A fusible plug maintains a spring-biased closure member out of contact with a seat in the outlet path. Upon melting of the fusible material, the closure member is released and urged into contact with the seat in the outlet path to prevent any further flow of material therethrough.

2 Claims, 5 Drawing Figures

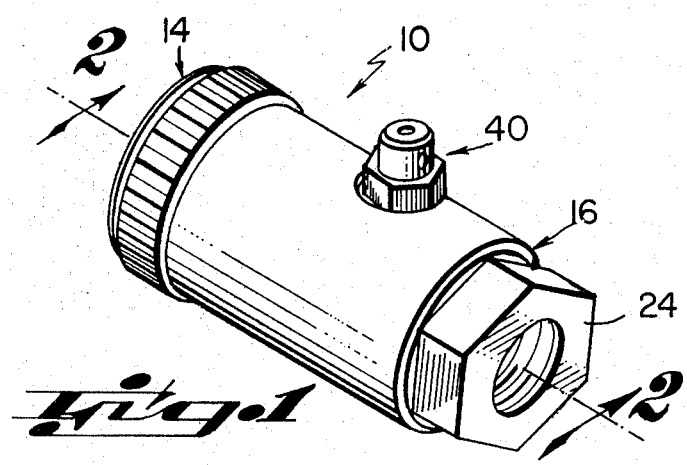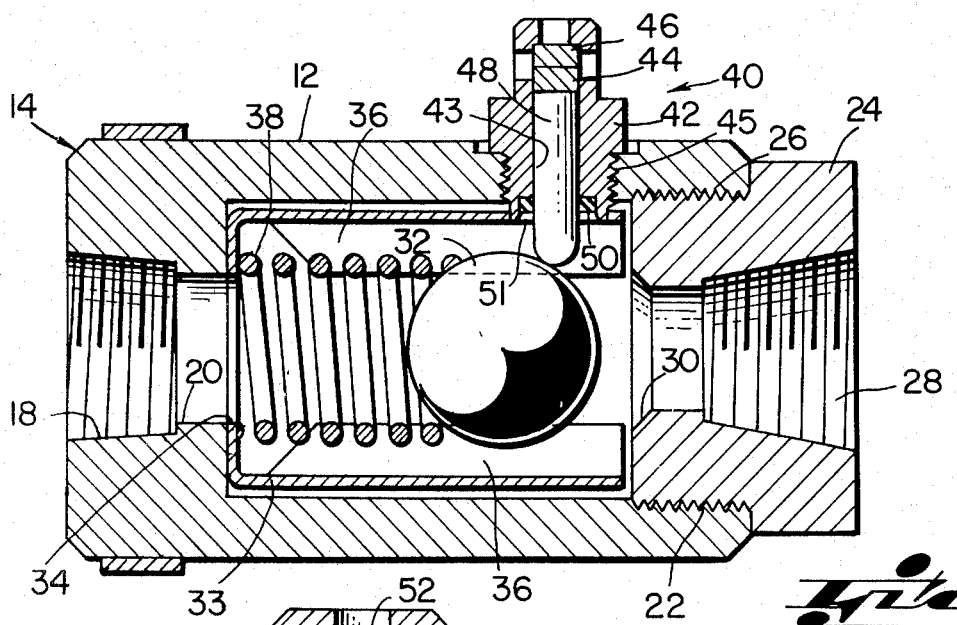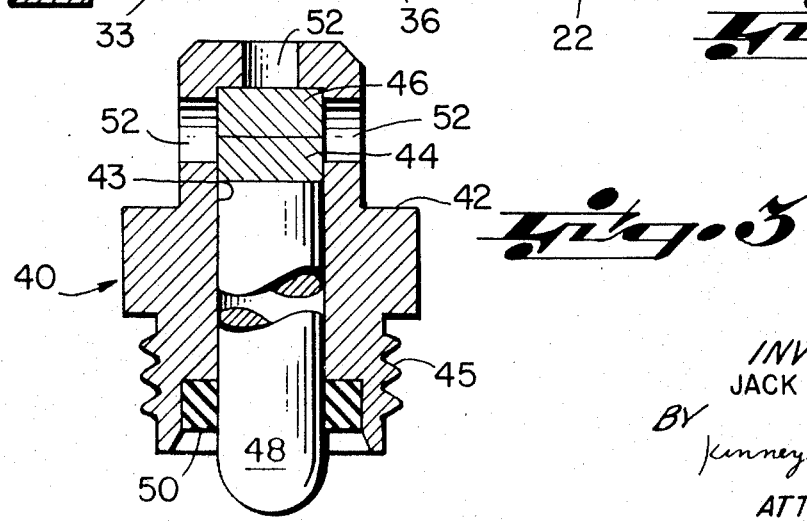

INVENTOR
JACK A. McMATH
BY Kinney & Schenk
ATTORNEYS

SAFETY VALVE

BACKGROUND OF THE INVENTION

This invention relates to valves and more particularly to a safety valve having a fusible plug member.

There are many instances where it is desirable to prevent or stop the flow of a volatile substance, such as paint, into an area where an excessive temperature exists, such as by the presence of a fire. These valves are needed to be operable in the immediate area where the work is being performed, such as in assembly line painting of automobiles. The safety valve must be responsive to increased temperatures caused by the fire and must provide a positive sealing action to prevent the flow of any further material through the valve.

Accordingly, it is an object of this invention to provide a safety valve responsive to elevations in temperature.

A further object of this invention is to provide a safety valve having a positive seating action in the presence of predetermined temperatures.

Yet another object of this invention is to provide a safety valve having few moving parts, yet is efficient in operation.

A still further object of this invention is to provide a spring-biased, temperature responsive safety valve.

SUMMARY OF THE INVENTION

This invention provides an improved safety valve for preventing the flow of material therethrough in the presence of a predetermined external temperature. The safety valve is of simple and economical construction, is responsive to a predetermined external temperature and has a positive seating action. The safety valve comprises a spring-biased member which is held out of seating engagement by a fusible plug.

Other details, uses, and advantages of this invention will become apparent as the following description of the exemplary embodiment thereof presented in the accompanying drawings proceeds.

BRIEF DESCRIPTION OF THE DRAWINGS

The accompanying drawings show a present exemplary embodiment of this invention in which:

FIG. 1 is a perspective view of the safety valve of this invention;

FIG. 2 is a cross-sectional view taken along line 2—2 of FIG. 1;

FIG. 3 is an enlarged sectional view of the fusible plug insert;

DESCRIPTION OF THE ILLUSTRATED EMBODIMENT

Figure 4:
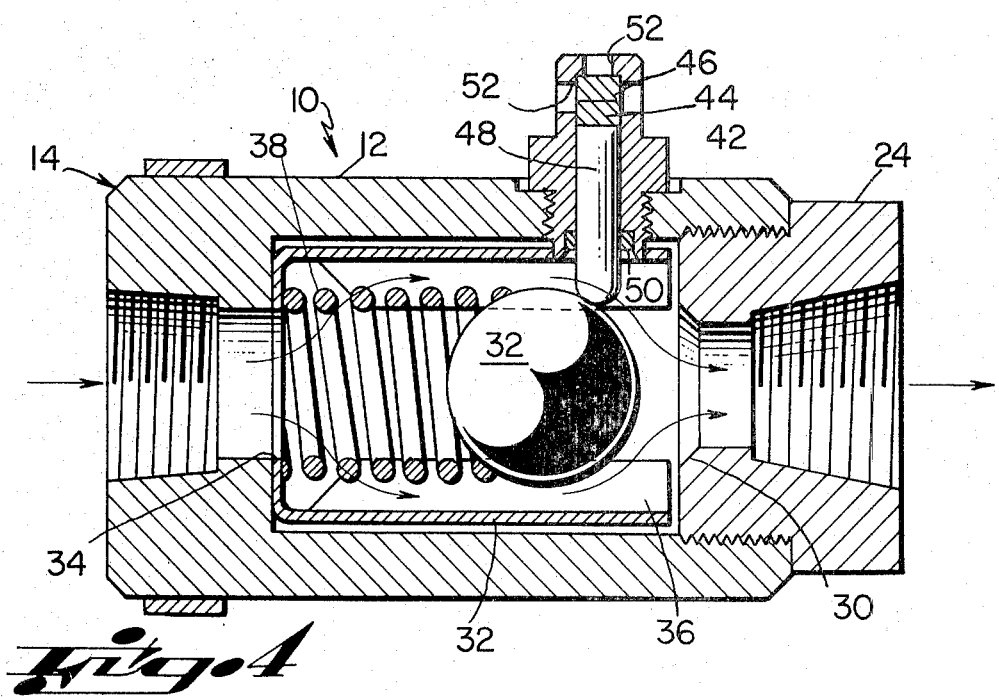
FIG. 4 is a view similar to FIG. 2 showing the flow pattern of the material passing through the safety valve.

Reference is now made to FIG. 1 of the drawings which illustrates one exemplary embodiment of the safety valve of this invention, which is designated generally by the reference numeral 10. The safety valve 10 is comprised of a housing 12 having an inlet end 14 and an outlet end 16.

The inlet end is formed with suitable means (FIG. 2), such as threads 18, to receive the supply line. The housing 12 is formed with a stepped bore 20 and terminates at the outlet end with suitable connecting means such as threads 22. An end cap 24 having complementary threads 26 is threadably secured to the housing 12 to provide the valve outlet. The outlet may be formed with any suitable means such as threads 28 to cooperatively engage a workpiece or further extension of the supply line. The end cap 24 is formed with a valve seat surface 30 to receive a closure member such as a ball 32 in seating engagement to prevent flow of material through the valve in a manner to be described herebelow. A guide member 33 being of substantially U shape, is mounted in the large portion of the stepped bore 20. The guide 33 is formed with an aperture 34 in the small or base portion of the guide. The guide 33 is so placed that the aperture 34 is aligned with the small portion of bore 20 so that the fluid may flow therethrough into the large portion of the bore. The elongated members or legs of the guide 33 serve as a raceway for the ball 32 in that the legs are also substantially U-shaped. Elongate arms 36, two each along each leg of guide 33, form the raceway along which ball 32 is movable. Resilient means, such as a spring 38, acts against the ball 32 to bias the ball downstream towards the outlet end and, in the absence of any resisting force, will cause the ball 32 to be seated against valve seat surface 30.

A fusible plug assembly, shown generally as 40, extends externally of the valve 10. As best seen in FIG. 3, the plug assembly 40 comprises a nut 42 which is suitably secured in the housing 12 by means such as threads 45. The nut 42 is formed with a bore 43 extending from the lower end thereof. Fusible plugs 44 and 46 are inserted in the bore 43 and are urged into contact with the end of the bore by a plunger or fuse pin 48 which is slidable within the bore 43. Apertures 52 are formed in the end of nut 42 so that the fusible plugs 44 and 46 are directly exposed to the atmosphere. The pin 48 has a rounded end which protrudes outward beyond the end of the nut 42. A suitable seal, such as a Teflon ring 50, is mounted in the end of the nut 42 in sealing engagement with the pin 48. The seal 50 prevents fluid from entering the bore 43 and solidifying therein so as to prevent movement of the pin 48. Referring again to FIG. 2, it is seen that the nut 42 extends into the large bore portion 20 and protrudes through an aperture 51 in the upper leg of the guide 33. In this manner, the pin 48 engages the ball 32 and prevents its movement downstream. With the pin 48 and ball 32 so engaged, the valve 10 is fully operable and fluid may pass therethrough.

Referring now to FIG. 4, the safety valve is seen in the operable condition with the fluid, such as the volatile paint or the like, flowing therethrough. Arrows generally designate the flow of the fluid. It is seen that the fluid enters the inlet 14 and flows through aperture 34 of the guide 33. The fluid then flows around the ball 32 and out the end cap 24.

Figure 5:
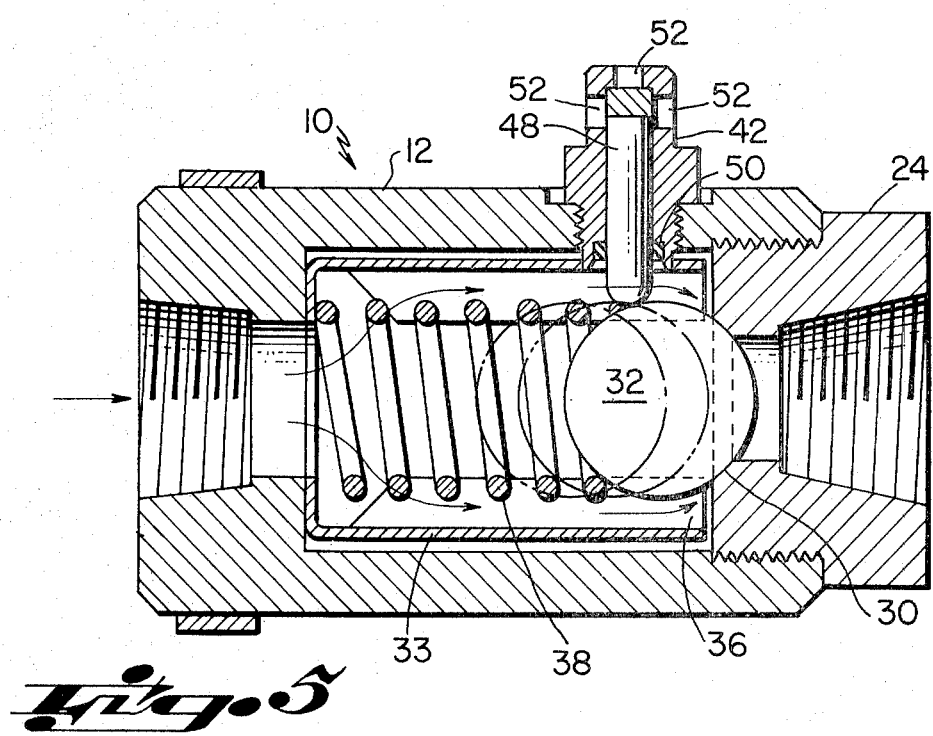
FIG. 5 shows the safety valve in seated engagement to prevent flow therethrough.

In the presence of an excessive temperature, the fusible plugs 44 and 46 will melt. This condition is shown in FIG. 5. The apertures 52 in the end of the nut 42 facilitates the fusible plug members being acted upon by the outside temperature, as well as the heat transfer through the nut body. As the fusible plugs 44 and 46 are melted, the compressed spring 38 and the fluid pressure of the material on the ball 32 urge the ball along the raceway in the downstream direction. The pin 48 will ride up the rounded edge of the ball 32 until such time as the pin 48 clears the extreme outer dimension of the ball 32. At this point, there is no further restraining force acting on the ball 32 and the action of the spring and fluid pressure forces the ball 32 into sealing engagement with valve seat surface 30 to close the safety valve 10 and prevent further flow therethrough. In FIG. 5, phantom lines show the movement of the ball. The fusible plugs 44 and 46 may be chosen from any suitable material according to the temperature at which the valve is desired to be closed.

The safety valve of this invention is of simple and economical construction, is responsive to a predetermined temperature and has a positive seating action due to spring pressure and fluid pressure after such predetermined temperature has been reached. Accordingly, it can be seen that the objects of this invention hereinbefore set forth have been accomplished.

While a present exemplary embodiment of this invention has been illustrated and described, it will be recognized that this invention may be variously embodied and practiced by those skilled in the art.

What is claimed is:

1. A safety valve comprising a housing having an inlet and outlet and a bore therethrough connecting the inlet and outlet, a raceway removably mounted in the bore upstream of the outlet, a ball mounted for movement along said raceway, resilient means urging said ball downstream towards the outlet, a nut secured in said housing and extending into said housing bore, said nut engaging said raceway to retain the raceway in an axially aligned position in said bore, said nut being formed with a bore from one end to adjacent the other end, fusible plugs mounted in said nut bore at said other end, a pin slidingly mounted in said nut bore and engaging said fusible plugs at one end, the other end of said pin engaging said ball to restrict the downstream movement of said ball, said fusible plugs being meltable at predetermined temperatures wherein said pin is urged radially outward along said nut bore by the force of said resilient means acting on said ball whereby said ball closes the valve outlet when said pin has moved a sufficient distance along the nut bore.

2. A safety valve comprising a housing having an inlet, a stepped bore in communication with the inlet, an end cap, means mounting said end cap to said housing to form the valve outlet, said end cap being formed with a valve seat surface in the outlet path, a raceway removably mounted in the large bore portion of the housing, said raceway being formed with an aperture therethrough, a ball mounted for movement along said raceway, a spring acting on said ball and urging said ball downstream into engagement with the valve seat surface to prevent flow through the valve, a nut mounted in said housing and extending inwardly to engage said raceway aperture to retain said raceway in an axially aligned position, said nut being formed with a bore extending from one end thereof to adjacent the other end, said nut bore being in communication with the large bore of the housing, a fusible plug being mounted in said nut bore at the other end thereof, a pin being slidingly mounted in said nut bore and extending from said fusible plug at one end to restraining engagement with said ball at the other end to maintain said ball out of engagement with said valve seat surface below a predetermined temperature where in when said predetermined temperature is reached, said pin releases said ball for engagement with said valve seat surface whereby further flow through the valve is prevented.

* * * * *